(12) United States Patent
Hasebe et al.

(10) Patent No.: US 7,163,229 B2
(45) Date of Patent: Jan. 16, 2007

(54) OCCUPANT PROTECTION DEVICE AND VEHICLE

(75) Inventors: Masahiro Hasebe, Shiga (JP); Yukitoshi Narimoto, Shiga (JP)

(73) Assignee: Takata Corporation (JP)

( * ) Notice: Subject to any disclaimer, the term of this patent is extended or adjusted under 35 U.S.C. 154(b) by 59 days.

(21) Appl. No.: 10/974,351

(22) Filed: Oct. 27, 2004

(65) Prior Publication Data

US 2005/0104340 A1  May 19, 2005

(30) Foreign Application Priority Data

Nov. 14, 2003  (JP) .............................. 2003-385324

(51) Int. Cl.
*B60R 21/16* (2006.01)
(52) U.S. Cl. .................................... 280/730.1
(58) Field of Classification Search ............. 280/730.1, 280/743.1, 728.2, 728.1
See application file for complete search history.

(56) References Cited

U.S. PATENT DOCUMENTS

| | | | |
|---|---|---|---|
| 5,213,361 A | 5/1993 | Satoh et al. | |
| 5,934,701 A | 8/1999 | Furukawa | |
| 6,224,088 B1 | 5/2001 | Lohavanijaya | |
| 6,431,586 B1 | 8/2002 | Eyrainer et al. | |
| 6,802,534 B1 | 10/2004 | Neupert | |
| 2001/0042979 A1 | 11/2001 | Frisch | |
| 2003/0141702 A1 | 7/2003 | Keutz | |

FOREIGN PATENT DOCUMENTS

| | | |
|---|---|---|
| DE | 10021845 | 11/2001 |
| DE | 10027893 | 11/2001 |
| EP | 1342528 | 9/2003 |
| JP | 49-23176 | 6/1974 |
| JP | 4-292239 | 10/1992 |
| JP | 4-292239 A | 10/1992 |
| JP | 4292239 | 10/1992 |
| JP | 04923176 A * | 10/1992 |

* cited by examiner

*Primary Examiner*—Faye M. Fleming
(74) *Attorney, Agent, or Firm*—Fitch, Even, Tabin & Flannery

(57) ABSTRACT

An occupant protection device for a vehicle is provided in which a main airbag including a left airbag section and a right airbag section surely inflates into a predetermined position. A main airbag includes a right airbag section which inflates on the right side ahead of an occupant and a left airbag section inflating on the left side ahead of the occupant. In one form, the occupant protection device further includes a ceiling airbag in a position substantially vertically above the lateral center of a passenger seat. The ceiling airbag inflates so as to project downward from a ceiling trim to be fitted in a space between the upper surfaces of the right airbag section and the left airbag section of the inflated main airbag to guide the main airbag to inflate surely into a predetermined position.

26 Claims, 6 Drawing Sheets

OCCUPANT PROTECTION DEVICE AND VEHICLE

FIELD OF THE INVENTION

The present invention relates to an airbag and an airbag device for protecting an occupant in the event of a car collision or the like and, more specifically, it relates to an airbag and an airbag device including a left airbag section and a right airbag section which inflate on the left side and the right side ahead of an occupant, respectively.

BACKGROUND OF THE INVENTION

An airbag for protecting an occupant in a car collision etc. is disclosed in Japanese Unexamined Patent Application Publication No. 4-292239, which includes a left airbag section and a right airbag section which inflates on the left side and the right side ahead of an occupant, respectively, and which inflates by a common inflator. In the airbag of this reference, the tip portions of the left airbag section and the right airbag section are linked with each other by a tie panel.

The airbag is accommodated in a case in a folded state and covered with a cover. When the inflator (gas generator) operating to discharge gas in a car collision, the airbag pushes open the cover while inflating toward the front of an occupant.

The inflator is disposed inside or outside the base end of the airbag. In an airbag device which has an inflator disposed outside the base end of the airbag, the gas emitted from the inflator is supplied into the airbag through a gas port provided on the base end of the airbag.

In disposing the inflator inside the base end of the airbag, the entire inflator can be disposed in the airbag or part of the inflator can be disposed in the airbag. An example of the latter one includes a structure in which a pair of slit openings is provided in the airbag, through which a rod inflator is passed, and both end portions of the inflator project outside the airbag.

The airbag disclosed in Japanese Unexamined Patent Application Publication No. 4-292239 has the possibility that the left airbag section and the right airbag section inflate in unexpected directions.

SUMMARY OF THE INVENTION

Accordingly, it is an object of the present invention to provide an occupant protection device and a vehicle in which a main airbag including a left airbag section and a right airbag section surely inflates to a predetermined position.

An occupant protection device according to the present invention including a main airbag of which tip portion inflates in the direction away from the base end by the gas emitted from an inflator disposed at the base end, the main airbag including: a left airbag section inflating on the left side ahead of an occupant; and a right airbag section inflating on the right side ahead of the occupant; wherein the occupant protection device includes a main-airbag-inflating-position limiting member provided on a vehicle body.

According to an embodiment of the invention, the limitation member is a projection projecting from the ceiling of the vehicle.

In that case, the projection is preferably a ceiling airbag inflating when the main airbag inflates.

In that case, the ceiling airbag may inflate toward the front of the head of the occupant.

According to another embodiment of the invention, the limitation member is a projection projecting from an instrument panel.

According to the invention, the projection may project between the left airbag section and the right airbag section or, alternatively, may project toward the center of an airbag adjacent to the center of the vehicle body of the left airbag section and the right airbag section.

According to yet another embodiment of the invention, the limitation member is a sun visor.

In that case, the sun visor can preferably be transformed by the pressure of the inflating main airbag.

According to the invention, preferably, the tip portions of the left airbag section and the right airbag section of the main airbag are not communicated with each other; and a space open to the occupant is formed between the tip portions of the left airbag section and the right airbag section with the main airbag in an inflated state.

A vehicle of the invention includes the occupant protection device according to the invention.

In the occupant protection device according to the present invention, the inflating position of a main airbag including a left airbag section and a right airbag section is limited by a limitation member provided to a vehicle body. Accordingly, the main airbag inflates surely in a predetermined position.

According to the invention, a projection projecting from the ceiling of the vehicle is provided as the limitation member. Accordingly, the inflating position of the main airbag can be surely limited.

In that case, since the projection is a ceiling airbag which inflates when the main airbag inflates, the ceiling airbag can also be set in a non-inflated state while the main airbag is in a non-inflated state. Accordingly, the projection is not obstructive in a normal state, keeping preferable appearance in the vehicle cabin.

According to the invention, the ceiling airbag may inflate toward the front of the head of an occupant, in which case the ceiling airbag inflates quickly from the cabin ceiling toward the front of the head of the occupant, allowing sufficient protection of the occupant's head. Therefore, the volume of the upper part (a part facing the head of the occupant) of the main airbag (the left airbag section and the right airbag section) can be decreased, so that the main airbag can be inflated quickly toward the front of the occupant without increasing the output of the main-airbag inflator.

According to the invention, also when a projection projecting from an instrument panel is provided as the limitation member, the inflating position of the main airbag can be surely limited.

Also the projection projecting from the instrument panel may be an airbag. In that case, the airbag can be kept in a non-inflated state while the main airbag is in a non-inflated state, with the structure in which the airbag is inflated when the main airbag inflates. Accordingly, in a normal state, the projection is not obstructive on the instrument panel, keeping preferable appearance in the vehicle cabin.

In the invention, when the projection is constructed to project between the left airbag section and the right airbag section, the projection is fitted between the left airbag section and the right airbag section of the main airbag when the main airbag inflates. Accordingly, the main airbag inflates surely in a predetermined position.

In the invention, when the projection is constructed to project toward the center of the vehicle body of the left airbag section and the right airbag section, the left airbag section and the right airbag section of the main airbag is put between the side of the cabin such as a door and the projection in the center of the cabin to inflate surely in a predetermined position.

In the invention, when the inflating position of the main airbag is limited by a sun visor, there is no need to provide a projection etc. on the cabin ceiling or the instrument panel, allowing the structure of the limitation member to be simplified significantly, and also keeping preferable appearance in the vehicle cabin.

In this embodiment, when the sun visor is constructed to be transformed by the pressure of the inflating main airbag, for example, when the sun visor is constructed to be transformed so as to enter the space between the left airbag section and the right airbag section of the main airbag by the pressure of the inflating main airbag, the main airbag inflates surely into a predetermined position by the transformed sun visor.

In the invention, preferably, the tip portions of the left airbag section and the right airbag section of the main airbag are not communicated with each other, and a space open to the occupant is formed between the tip portions of the left airbag section and the right airbag section with the main airbag in an inflated state.

When such a main airbag inflates, the left airbag section receives the left breast of the occupant and the right airbag section receives the right breast of the occupant. The left and right breasts have hard and strong ribs. The left airbag section and the right airbag section receive and absorb the impact of the passenger via the ribs. The main airbag in an inflated state has an intervalley-like space between the tip portions of the left airbag section and the right airbag section, and the vicinity of the breastbone at the center of the passenger's breast faces the space. Accordingly, when the body of the passenger strikes against the inflated main airbag, the vicinity of the breastbone does not receive so large reaction force from the main airbag that load on the vicinity of the breastbone is decreased.

DETAILED DESCRIPTION OF THE PREFERRED EMBODIMENTS

Embodiments of the present invention will be described hereinafter with reference to the drawings.

Figure 1:
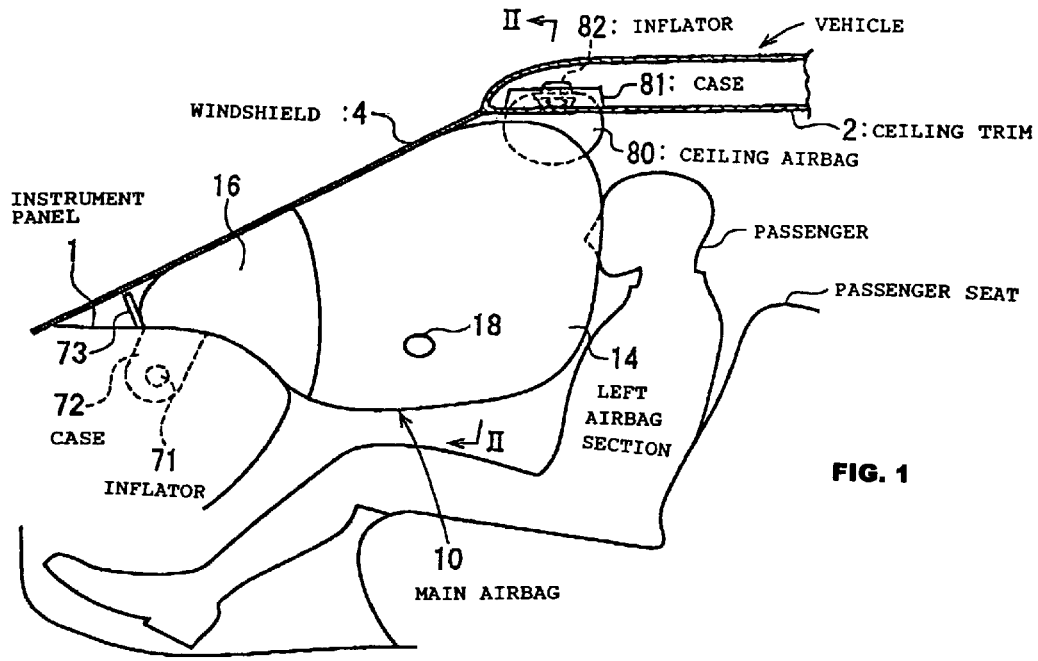
FIG. 1 is a side view of the interior of a vehicle cabin including an occupant protection device according to an embodiment of the present invention.
Figure 2:
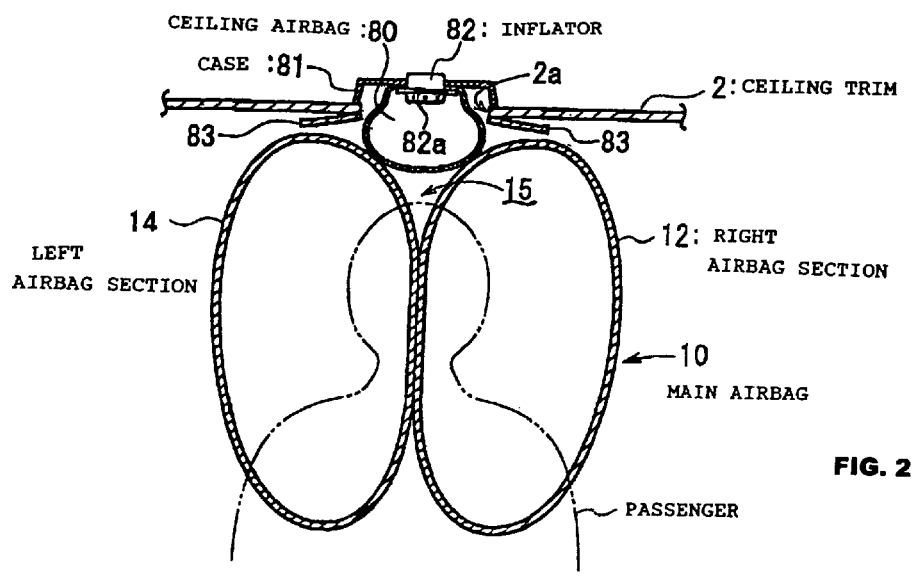
FIG. 2 is a cross-sectional view taken along line II—II of FIG. 1.
Figure 3:
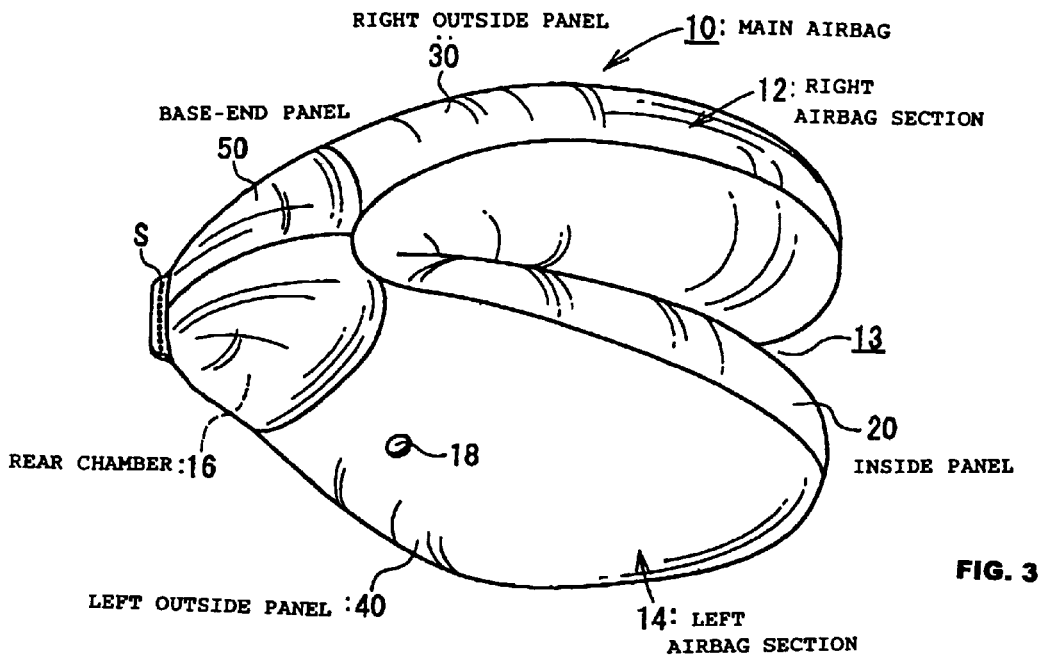
FIG. 3 is a perspective view of the main airbag of FIG. 1.
Figure 4:
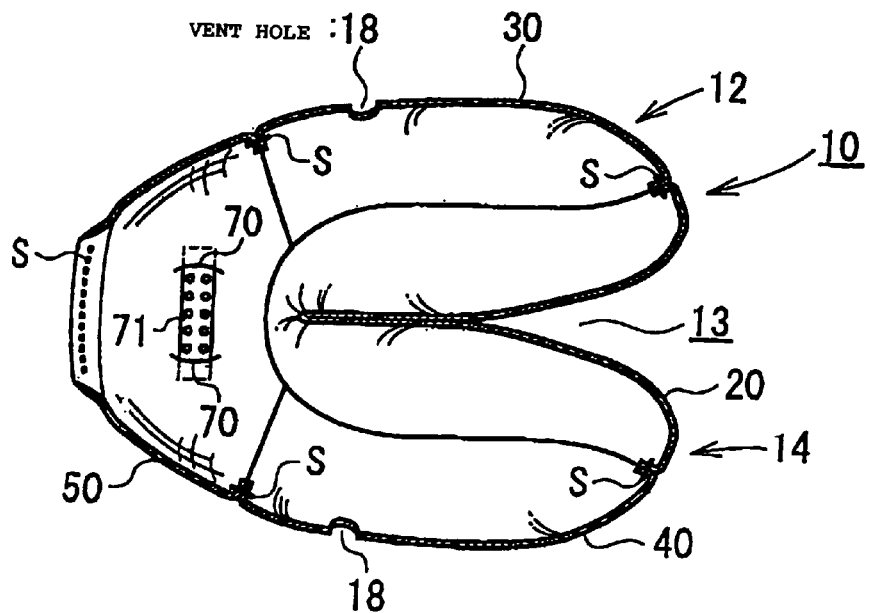
FIG. 4 is a horizontal cross-sectional view of the main airbag of FIG. 1.
Figures 5, 6:
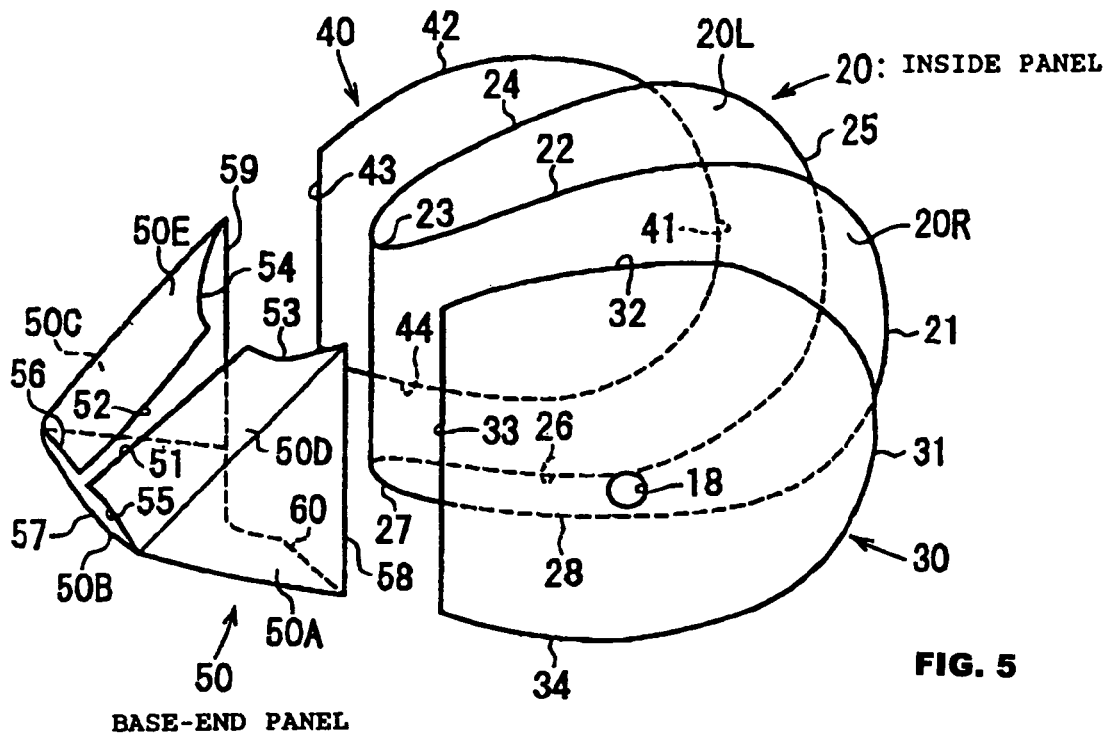
FIG. 5 is an exploded view of the panel constitution of the main airbag of FIG. 1.
FIG. 6 is a diagram showing the procedure of manufacturing the main airbag of FIG. 1.

FIG. 1 is a side view of the interior of a vehicle cabin including an occupant protection device according to an embodiment of the present invention, showing a state in which a main airbag and a ceiling airbag are in an inflated state. FIG. 2 is a cross-sectional view taken along line II—II of FIG. 1. FIG. 3 is a perspective view of the main airbag. FIG. 4 is a horizontal cross-sectional view of the main airbag. FIGS. 5 and 6 are exploded views of the main airbag.

In this embodiment, the occupant protection device is a front-passenger protection device of a vehicle (car). The occupant protection device includes a main airbag 10 which inflates toward the front of a front passenger from an instrument panel 1 provided in front of a passenger seat and a ceiling airbag 80 which inflates so as to project downward from a cabin ceiling (ceiling trim 2) to construct a projection serving as a limitation member for limiting the inflating position of the main airbag 10. Numeral 4 in FIG. 1 indicates a windshield of the vehicle to which the occupant protection device is mounted.

As shown in FIGS. 2 and 4, the main airbag 10 includes a right airbag section 12 which inflates on the right side ahead of a passenger, a left airbag section 14 which inflates on the left side ahead of the passenger, and a rear chamber 16 which communicates with the base ends of the right airbag section 12 and the left airbag section 14. The rear chamber 16 includes a gas port (its numeral is omitted) of an inflator 71.

As shown in FIG. 4, with the main airbag 10 in an inflated state, there is no bridge member such as a tie panel between the tip portions of the right airbag section 12 and the left airbag section 14, an intervalley-like space 13 between the tip portions of the bag sections 12 and 14 is open to the passenger (to the right in FIG. 4). Referring to FIG. 2, an intervalley-like space 15 adjacent to the space 13 and formed between the upper surfaces (parts facing the ceiling trim 2 in an inflated state) of the bag sections 12 and 14 is open upward.

With the main airbag 10 in a fully inflated state, the interval between the leading edge of the right airbag section 12 and the leading edge of the left airbag section 14 is preferably from 150 mm to 350 mm, more preferably, from 170 mm to 330 mm.

A vent hole 18 is provided on each of the outer sides of the right and left airbag sections 12 and 14.

The inflator 71 for the main airbag 10 is rod like in this embodiment, of which the part between the axial opposite ends serves as the gas port. As shown in FIG. 4, the panel that constructs the lower surface of the rear chamber 16 of the main airbag 10 (the bottom of a base-end panel 50, to be described later) has two substantially parallel slits 70 and 70. The inflator 71 is inserted into the slits 70 and 70 so as to pass through the rear chamber 16 along the width of the vehicle (laterally). Both end portions of the inflator 71 are disposed outside the main airbag 10 through the slits 70 and 70.

Referring then to FIGS. 3 to 6, the structure and the manufacturing procedure of the panels (outer shell) of the main airbag 10 will be described.

The main airbag 10 is composed of a total of four panels, an inside panel 20, a right outside panel 30, a left outside panel 40, and a base-end panel 50.

The inside panel 20 is a substantially gourd-shaped long and slender panel, which is folded in two at the center to form a right side 20R and a left side 20L. Of the inside panel 20, the right side 20R constructs the inner side of the right airbag section 12 and the left side 20L constructs the inner side of the left airbag section 14. The peripheral side of the inside panel 20 is constructed of the lower edge 28, a tip edge 21, an upper edge 22 of the right side 20R, an upper edge 23 in the vicinity of a fold-back portion which constructs the deep most part of the recess of the airbag, the upper edge 24, a tip edge 25, a lower edge 26 of the left side 20L, and a lower edge 27 in the vicinity of the fold-back portion.

The peripheral side of the right outside panel 30 is constructed of a tip edge 31, an upper edge 32, a linear rear edge 33, and a lower edge 34. The peripheral side of the left outside panel 40 is constructed of a tip edge 41, an upper edge 42, a linear rear edge 43, and a lower edge 44.

The base-end panel 50 includes a right side surface 50A, a bottom surface 50B, a left side surface 50C, a right flap 50D which constructs the upper-surface right side, and a left flap 50E which constructs the upper-surface left side. The base-end panel 50 is folded to form the side surfaces 50A and 50C into a substantially triangle and open in the surface adjacent to the tip end of the airbag.

The entire peripheral edge of the base-end panel 50 is constructed of respective opposing edges 51 and 52 of the substantially rectangular flaps 50D and 50E, the respective front edges (the flap front edges) 53 and 54 of the flaps 50D and 50E, the respective rear edges 55 and 56 of the flaps 50D and 50E, a rear edge 57 facing the rear edges 55 and 56, the respective front edges (side front edges) 58 and 59 of the side surfaces 50A and 50C, and the bottom front edge 60 connecting the side front edges 58 and 59.

To manufacture the main airbag 10, the base-end panel 50 is first opened flat and then the rear edge 33 of the right outside panel 30 is joined with the side front edge 58, and the rear edge 43 of the left outside panel 40 is joined with the side front edge 59, respectively, by stitch. Then the respective opposing edges 51 and 52 of the flaps 50D and 50E of the base-end panel 50 are stitched together. Thus, the panels 30, 40, and 50 are formed into the shape in FIG. 6. Symbol S of FIG. 6 shows the seam of the stitching.

As shown in FIG. 6, the right outside panel 30 and the right side 20R of the inside panel 20 are opposed and the tip edges 21 and 31, the upper edges 22 and 32, and the lower edges 28 and 34 are stitched together, respectively. Also the left outside panel 40 and the left side 20L of the inside panel 20 are opposed and the tip edges 25 and 41, the upper edges 24 and 42, and the lower edges 26 and 44 are stitched together, respectively. The flap front edges 53 and 54 of the base-end panel 50 are joined with the upper edge 23 in the vicinity of the fold-back portion of the inside panel 20 by stitch. The bottom front edge 60 of the base-end panel 50 is joined with the vicinity of the lower edge 27 in the vicinity of the fold-back portion by stitch.

Thus the main airbag 10 (FIG. 3) is brought into a state in which it is turned inside out, or the seam is exposed to the surface of the airbag. As shown in FIG. 6, the flap rear edges 55 and 56 of the base-end panel 50 and the rear edge 57 are not yet stitched together, forming an opening M.

The main airbag 10 is thus turned inside out through the opening M. Then the opening M is stitched to form the main airbag 10 shown in FIG. 3.

As shown in FIG. 4, the bottom of the base-end panel 50 has the two substantially parallel slits 70 and 70 for the inflator 71 to pass through, and the inflator 71 is inserted at the slits 70 and 70.

The instrument panel 1 has a main-airbag inflating opening (not shown) in the upper surface. A case (container) 72 for accommodating the main airbag 10 is provided in the main-airbag inflating opening. The case 72 is shaped like a top-open box, of which the top open portion (not shown) faces the main-airbag inflating opening. The base end (rear chamber 16) of the main airbag 10 connects into the case 72. Both end portions of the inflator 71 which are disposed outside the rear chamber 16 are also fixed into the case 72.

The main airbag 10 is normally accommodated in the case 72 in a folded state. A lid 73 is mounted so as to cover the top open portion of the case 72 (and the main-airbag inflating opening of the instrument panel 1). The lid 73 is arranged such that the top is substantially flush with the upper surface of the instrument panel 1. When the main airbag 10 inflates, the lid 73 is pushed open by the main airbag 10 to open the main-airbag inflating opening, as shown in FIG. 1. The lid 73 may be integrated with the instrument panel 1.

Referring to FIG. 2, in this embodiment, a ceiling-airbag inflating opening 2a is provided in the position of the ceiling trim 2 substantially vertically above the vicinity of the lateral center of the passenger seat. The ceiling airbag 80, in this embodiment, inflates to project downward from the ceiling-airbag inflating opening 2a to be fitted into the space 15 between the upper surfaces of the right airbag section 12 and the left airbag section 14 of the main airbag 10 which are in an inflated condition, thereby limiting the direction and position of the inflation of the main airbag 10 such that the inflated right airbag section 12 faces the right half of the passenger and the left airbag section 14 faces the left half of the passenger.

As shown in FIG. 2, the ceiling-airbag inflating opening 2a includes therein a case (container) 81 for accommodating the ceiling airbag 80. The base end of the ceiling airbag 80 is connected to the case 81 via the inflator 82. The case 81 is in a bottom-open box shape, of which the bottom open portion (its numeral is omitted) faces the ceiling-airbag inflating opening 2a.

The inflator 82 for the ceiling airbag 80 is, in this embodiment, shaped like a substantially cylindrical column which is short along the axis, the gas port (reference numeral is omitted) at the tip end (the lower end in FIG. 2) is disposed in the ceiling airbag 80 via an inflator opening (reference numeral is omitted) provided at the base end of the ceiling airbag 80. A flange 82a projects from the side circumference of the inflator 82. Between the flange 82a and the case 81, the periphery of the inflator opening (the base end of the ceiling airbag 80) is interposed.

Also the ceiling airbag 80 is normally accommodated in the case 81 in a folded state and has a lid 83 to cover the bottom opening of the case 81. In this embodiment, the lid 83 is integrated with the ceiling trim 2. When the ceiling airbag 80 inflates, the lid 83 is torn by the pressure of the ceiling airbag 80 to open into a flap shape, as shown in FIG. 2, thereby opening the ceiling-airbag inflating opening 2a.

When a vehicle including the occupant protection device with such a structure collides at the front, the respective inflators 72 and 82 for the main airbag 10 and the ceiling airbag 80 emit a jet of gas, so that the main airbag 10 and the ceiling airbag 80 start to inflate with the gas from the inflators 72 and 82. The main airbag 10 pushes the lid 73 open to inflate toward the front region of the passenger through the main-airbag inflating opening of the instrument panel 1. The ceiling airbag 80 tears the lid 83 open to inflate so as to project downward through the ceiling-airbag inflating opening 2a of the ceiling trim 2. The inflated ceiling airbag 80 is fitted into the space 15 between the right airbag section 12 and the left airbag section 14 of the inflated main airbag 10.

In this occupant protection device, the inflated ceiling airbag 80 is located in the position substantially vertically above the vicinity of the lateral center of the passenger seat. Accordingly, the ceiling airbag 80 is fitted into the space 15 between the right airbag section 12 and the left airbag section 14 of the main airbag 10, so that the inflated right airbag section 12 surely faces the right half of the passenger, the left airbag section 14 faces the left half of the passenger, and the lateral center of the passenger's body faces the space 13 between the tip portions of the bag sections 12 and 14. This prevents the lateral rolling etc. of the inflated main airbag 10 to stabilize the inflating position of the main airbag 10.

In this embodiment, the gas from the inflator 71 first inflates the rear chamber 16 of the main airbag 10 and then flows into the right airbag section 12 and the left airbag section 14 to inflate them. During that time, the first inflated rear chamber 16 comes into contact with the instrument panel 1 and so its position becomes stable, so that the position of the right airbag section 12 and the left airbag section 14 becomes stable not only at completion of inflation but also in the process of inflation.

Since gas is supplied substantially equally from the inflated rear chamber 16 to the right and left airbag sections 12 and 14, both of the right airbag section 12 and the left airbag section 14 inflate smoothly and substantially equally from the beginning of the inflation.

When a passenger strikes against the main airbag 10 inflated in that way, the right airbag section 12 receives the right breast of the passenger and the left airbag section 14 receives the left breast of the passenger. The left and right breasts have hard and strong ribs. The right airbag section 12 and the left airbag section 14 receive and absorb the impact of the passenger via the ribs. Since the vicinity of the breastbone at the center of the passenger's breast faces the intervalley-like space 13 between the tip portions of the right airbag section 12 and the left airbag section 14, the vicinity of the breastbone does not receive so large reaction force from the main airbag 10 that load on the vicinity of the breastbone is decreased.

In this embodiment, the ceiling airbag 80 inflates so as to project downward from the opening 2a of the ceiling trim 2 in the event of a car collision. However, the ceiling airbag 80 is normally accommodated in a folded state in the case 81 provided in the opening 2a, so that the ceiling airbag 80 is not obstructive, keeping preferable appearance in the vehicle cabin.

Figure 7:
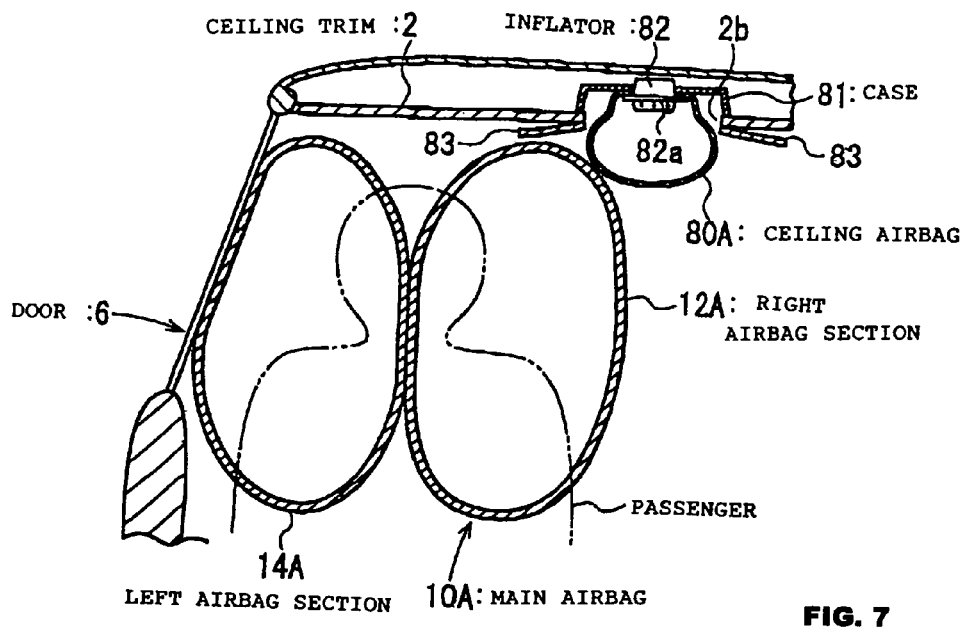
FIG. 7 is a cross-sectional view of an occupant protection device according to another embodiment of the present invention.

FIG. 7 is a cross-sectional view of an occupant protection device according to another embodiment of the invention, showing the same part as that of FIG. 2.

Also in this embodiment, the occupant protection device includes a main airbag 10A which inflates toward the front of a front passenger from a instrument panel (not shown) provided in front of a passenger seat and a ceiling airbag 80A which inflates so as to project downward from a cabin ceiling (ceiling trim 2) to construct a projection serving as a limitation member for limiting the inflating position of the main airbag 10A.

Also the main airbag 10A includes a right airbag section 12A which inflates on the right side ahead of a passenger, a left airbag section 14A which inflates on the left side ahead of the passenger, and a rear chamber (not shown) which communicates the base ends of the right airbag section 12A and the left airbag section 14A with each other with an inflator (not sown) being disposed in the rear chamber. Also the main airbag 10A is constructed such that, in an inflated state, the right airbag section 12A faces the right half of the passenger and the left airbag section 14A faces the left half of the passenger, and a space (not shown) between the tip portions of the bag sections 12A and 14A faces the lateral center of the passenger's body.

In this embodiment, with the main airbag 10A in an inflated state, the right airbag section 12A is located adjacent to the center of the cabin, while the left airbag section 14A is located adjacent to the side of the cabin (a door 6). As shown in the drawing, the outer side (the side opposite to the right airbag section 12A) of the left airbag section 14A faces the door 6 in a state in which it is inflated in a predetermined position, as has been indicated in the drawing.

Although not shown, also the embodiment has a main-airbag inflating opening on the upper surface of the instrument panel. A top-open-box case (container) for accommodating the main airbag 10A is provided in the main-airbag inflating opening. The base end of the main airbag 10A is connected into the case. The main airbag 10A is normally accommodated in the case in a folded state and a lid is mounted so as to cover the upper opening (and the main-airbag inflating opening of the instrument panel) of the case.

In this embodiment, a ceiling-airbag inflating opening 2b is provided in the region of the ceiling trim 2 adjacent to the center of the cabin with respect to the right airbag section 12A of the main airbag 10 in an inflated state at the predetermined position, as has been described. The ceiling airbag 80A inflates so as to project from the ceiling-airbag inflating opening 2b downward to face the right airbag section 12A in an inflated state from the center of the cabin, thereby preventing the right airbag section 12A from inflating toward the center of the cabin over the predetermined position.

Also in this embodiment, the ceiling-airbag inflating opening 2b includes therein the bottom-open box case (container) 81 for accommodating the ceiling airbag 80A. The base end of the ceiling airbag 80A is connected to the case 81 via the inflator 82. The structure in which the ceiling airbag 80A is connected to the case 81 via the inflator 82 is the same as that of the embodiment of FIGS. 1 to 6. Also the ceiling airbag 80A is normally accommodated in the case 81 in a folded state and has the lid 83 so as to cover the bottom opening of the case 81.

The other structure of the occupant protection device is the same as that of the embodiment of FIGS. 1 to 6. The same numerals in FIG. 7 as those of FIGS. 1 to 6 indicate the same components.

When a vehicle including the occupant protection device with such a structure collides at the front, the inflator (not shown) for the main airbag 10A and the inflator 82 for the ceiling airbag 80A emit a jet of gas, so that the main airbag 10A and the ceiling airbag 80A start to inflate. The main airbag 10A pushes the lid open to inflate toward the front region of the passenger through the main-airbag inflating opening of the instrument panel. The ceiling airbag 80A tears the lid 83 open to inflate so as to project downward through the ceiling-airbag inflating opening 2b of the ceiling trim 2.

In this occupant protection device, the door 6 faces the outer side of the inflated left airbag section 14A and the inflated ceiling airbag 80A faces the part of the inflated right airbag section 12A adjacent to the center of the cabin. Accordingly, the main airbag 10 inflates surely in a predetermined position while being interposed between the door 6 and the inflated ceiling airbag 80A. This prevents the lateral rolling etc. of the inflated main airbag 10A to stabilize the inflating position of the main airbag 10A.

Also in this embodiment, the ceiling airbag 80A inflates so as to project downward from the opening 2b of the ceiling trim 2 in the event of a car collision. However, the ceiling airbag 80A is normally accommodated in the case 81 provided in the opening 2b in a folded state, so that the ceiling airbag 80A is not obstructive, keeping preferable appearance in the vehicle cabin.

Figure 8:
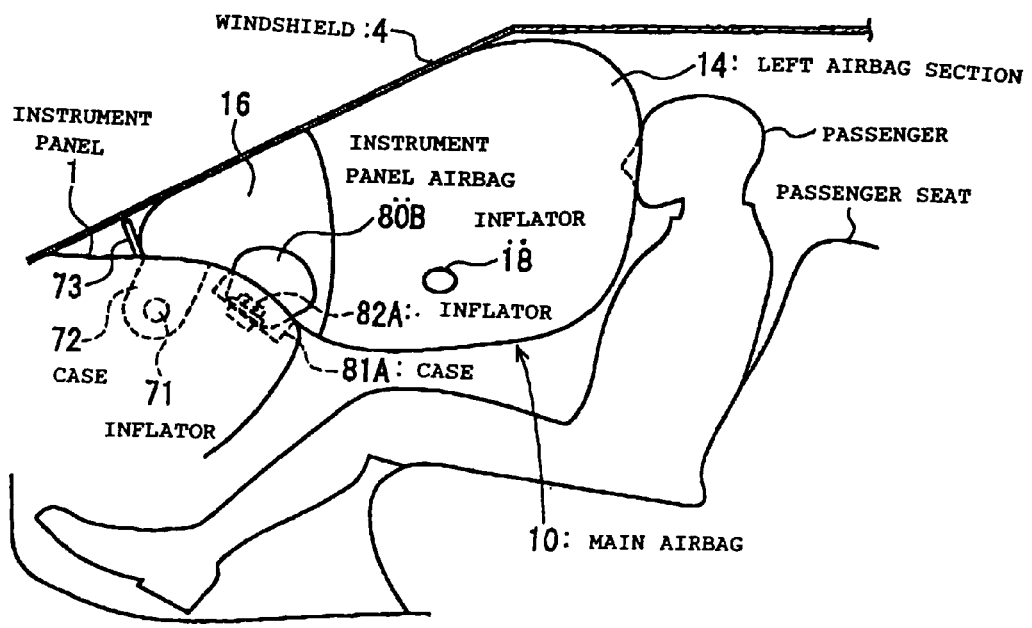
FIG. 8 is a side view of the interior of a vehicle cabin including an occupant protection device according to a yet another embodiment of the present invention.

FIG. 8 is a cross-sectional view of an occupant protection device according to a yet another embodiment of the present invention, showing the same part as that of FIG. 1.

In this embodiment, the occupant protection device includes the main airbag 10 which inflates toward the front of a front passenger from the instrument panel 1 provided in front of a passenger seat and an airbag 80B (hereinafter, the airbag 80B is referred to as an instrument-panel airbag 80B) which inflates so as to project from the instrument panel 1 on the left and right sides of the inflated main airbag 10 to construct a projection serving as a limitation member for limiting the inflating position of the main airbag 10.

The main airbag 10 is the same as that according to the embodiment of FIGS. 1 to 6 and includes the right airbag section 12 which inflates on the right side ahead of the passenger, the left airbag section 14 which inflates on the left side ahead of the passenger, and the rear chamber 16 which communicates with the base ends of the right airbag section 12 and the left airbag section 14. The rear chamber 16 includes the inflator 71. Also in this embodiment, the main airbag 10 is constructed such that, in an inflated state, the right airbag section 12 faces the right half of the passenger, the left airbag section 14 faces the left half of the passenger, and the space (not shown) between the tip portions of the bag sections 12 and 14 faces the lateral center of the passenger's body.

Also this embodiment has a main-airbag inflating opening (not shown) in the upper surface of the instrument panel 1. The top-open box case (container) 72 for accommodating the main airbag 10 is provided in the main-airbag inflating opening. The base end (the rear chamber 16) of the main airbag 10 and the inflator 71 are connected into the case 72. The main airbag 10 is normally accommodated in the case 72 in a folded state and the lid 73 is mounted so as to cover the upper opening (and the main-airbag inflating opening of the instrument panel 1) of the case 72.

In this embodiment, an instrument-panel-airbag inflating opening (not shown) is provided in each region of the instrument panel 1 adjacent to the left and right sides of the main airbag 10 in an inflated state through the main-airbag inflating opening into the predetermined position, as has been described. The instrument-panel airbag 80B is provided at the left and right sides of the main airbag 10 and inflates so as to project through the instrument-panel-airbag inflating opening into the cabin to face the outer sides of the right airbag section 12 and the left airbag section 14 of the main airbag 10 in an inflated state. Thus, the right airbag section 12 and the left airbag section 14 are guided to inflate into predetermined positions.

A top-open box case (container) 81A for accommodating the instrument-panel airbag 80B is disposed in each of the instrument-panel-airbag inflating openings. The base ends of the instrument-panel airbags 80B are connected to the cases 81A via an inflator 82A. The structure of the inflator 82A is the same as that of the inflator 82 for the ceiling airbag in the embodiment of FIGS. 1 to 6. The structure in which the instrument-panel airbags 80B are connected to the cases 81A via the inflator 82A is the same as the structure in which the ceiling airbag 80 is connected to the case 81 via the inflator 82 in the embodiment of FIGS. 1 to 6.

The instrument-panel airbags 80B are normally accommodated in the cases 81A in a folded state and a lid (not shown) is mounted so as to cover the upper opening (and the instrument-panel-airbag inflating openings of the instrument panel 1) of each case 81A.

When a vehicle including the occupant protection device with such a structure collides at the front, the inflator 72 for the main airbag 10 and the inflator 82A for the instrument-panel airbags 80B emit a jet of gas, so that the main airbag 10 and the instrument-panel airbags 80B start to inflate with the gas from the inflators 72 and 82A. The main airbag 10 pushes the lid 73 open to inflate toward the front region of the passenger through the main-airbag inflating opening of the instrument panel 1. The instrument-panel airbags 80B tear the lid 73 open to inflate so as to project into the cabin through the instrument-panel-airbag inflating openings of the instrument panel 1.

In this occupant protection device, the instrument-panel airbags 80B which have inflated to project from the instrument panel 1 face the outer sides of the inflated right airbag section 12 and left airbag section 14, respectively. Accordingly, the main airbag 10 surely inflates into a predetermined position while being interposed between the instrument-panel airbags 80B and 80B. This prevents the lateral rolling etc. of the inflated main airbag 10 to stabilize the inflating position of the main airbag 10.

In this embodiment, the instrument-panel airbags 80B inflate so as to project into the cabin through the instrument-panel-airbag inflating openings in the event of a car collision. However, each of the instrument-panel airbags 80B is normally accommodated in the case 81A provided in the instrument-panel-airbag inflating opening in a folded state, so that the instrument-panel airbags 80B are not obstructive, keeping preferable appearance in the vehicle cabin.

Figure 9:
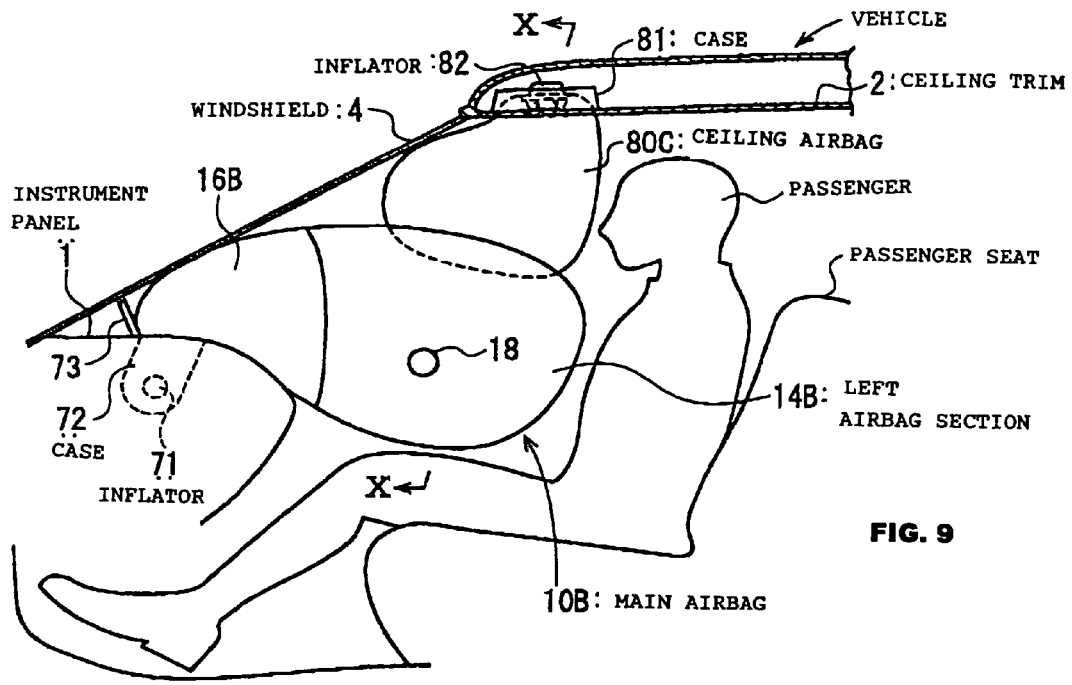
FIG. 9 is a side view of the interior of a vehicle cabin including an occupant protection device according to still another embodiment of the present invention.
Figure 10:
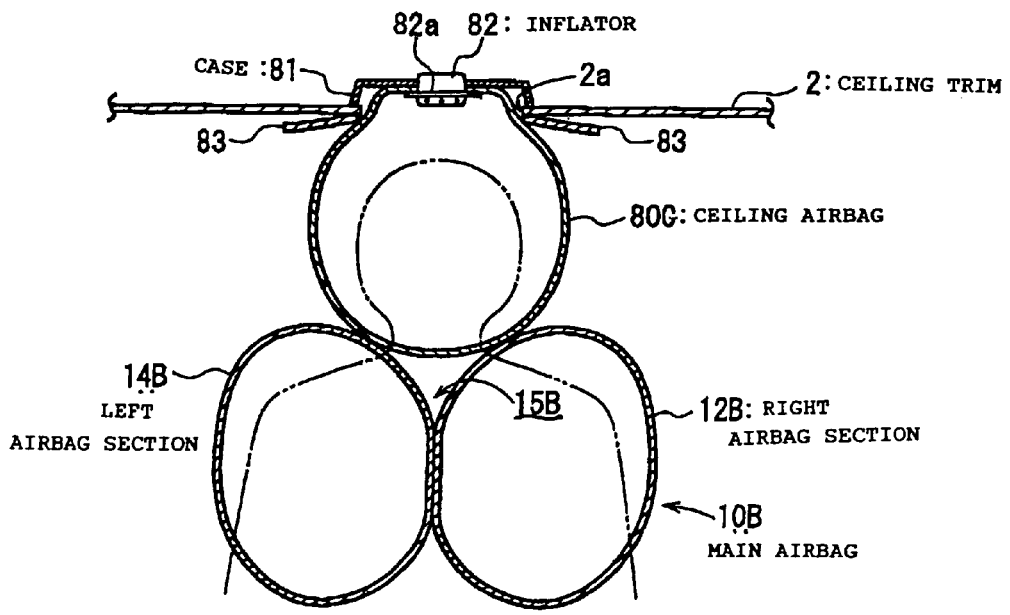
FIG. 10 is a cross-sectional view taken along line X—X of FIG. 9.

FIG. 9 is a side view of the interior of a vehicle cabin including an occupant protection device according to still another embodiment of the present invention. FIG. 10 is a cross-sectional view taken along line X—X of FIG. 9.

In this embodiment, the occupant protection device includes a main airbag 10B which inflates toward the front of a front passenger from the instrument panel 1 provided in front of a passenger seat and a ceiling airbag 80C which inflates from a cabin ceiling (ceiling trim 2) toward the front of the head of the passenger and constructs a projection serving as a limitation member for limiting the inflating position of the main airbag 10B.

The main airbag 10B of this embodiment includes a right airbag section 12B which inflates so as to face the vicinity of the right breast of a passenger on the right half ahead of the passenger, a left airbag section 14B which inflates so as to face the vicinity of the left breast of the passenger on the left half ahead of the passenger, and a rear chamber 16B which communicates the base ends of the right airbag section 12B and the left airbag section 14B together. The rear chamber 16B includes the inflator 71 therein.

Also this embodiment has a main-airbag inflating opening (not shown) in the upper surface of the instrument panel 1. The top-open box case (container) 72 for accommodating the main airbag 10B is provided in the main-airbag inflating opening. The base end (the rear chamber 16) of the main airbag 10B and the inflator 71 are connected into the case 72.

The main airbag 10B is normally accommodated in the case 72 in a folded state and the lid 73 is mounted so as to cover the upper opening (and the main-airbag inflating opening of the instrument panel 1) of the case 72.

Referring to FIG. 10, in this embodiment, the ceiling-airbag inflating opening 2a is provided in the region of the ceiling trim 2 substantially vertically above the vicinity of the lateral center of the passenger seat. The ceiling airbag 80C, in this embodiment, inflates toward the front of the head of the passenger through the ceiling-airbag inflating opening 2a to fit into a space 15B between the upper surfaces of the right airbag section 12B and the left airbag section 14B of the main airbag 10B which have inflated into positions ahead of the vicinity of the left and right breasts of the passenger through the main-airbag inflating opening of the instrument panel 1.

Also in this embodiment, the ceiling-airbag inflating opening 2a includes therein the case (container) 81 for accommodating the ceiling airbag 80C. The base end of the ceiling airbag 80C is connected to the case 81 via the inflator 82. The structure in which the ceiling airbag 80C is connected to the case 81 via the inflator 82 is the same as that of the embodiment of FIGS. 1 to 6. Also the main airbag 80C is normally accommodated in the case 81 in a folded state and the lid 83 is mounted so as to cover the bottom opening of the case 81.

When a vehicle including the occupant protection device with such a structure collides at the front, the respective inflators 71 and 82 for the main airbag 10B and the ceiling airbag 80C emit a jet of gas, so that the main airbag 10B and the ceiling airbag 80C start to inflate. The main airbag 10B pushes the lid 73 open to inflate toward a region ahead of the left and right breasts of the passenger through the main-airbag inflating opening of the instrument panel 1. The ceiling airbag 80C tears the lid 83 open through the ceiling-airbag inflating opening 2a of the ceiling trim 2 to inflate toward the front of the head of the passenger. The inflated ceiling airbag 80C is fitted into the space 15B between the right airbag section 12B and the left airbag section 14B of the inflated main airbag 10B.

In this occupant protection device, the inflated ceiling airbag 80C is located in a position substantially vertically above the vicinity of the lateral center of the passenger seat. Accordingly, the ceiling airbag 80C is fitted into the space 15B between the right airbag section 12B and the left airbag section 14B of the main airbag 10B, so that the inflated right airbag section 12B surely faces the vicinity of the right breast of the passenger, the left airbag section 14B faces the vicinity of the left breast of the passenger, and the region in the vicinity of a passenger's breastbone faces a space (not shown) between the tip portions of the bag sections 12B and 14B.

The right airbag section 12B of the inflated main airbag 10B receives the right breast of the passenger, the left airbag section 14B receives the left breast of the passenger, and the ceiling airbag 80C which has inflated toward the front of the head of the passenger receives the passenger's head, thus protecting the passenger.

In this embodiment, it is sufficient for the right airbag section 12B and the left airbag section 14B of the main airbag 10B to receive only in the vicinity of the right and left breasts of the passenger, so that they can be relatively small in volume. This allows the entire main airbag 10B to be inflated quickly without increasing the output of the inflator 71. Since the ceiling airbag 80C inflates toward the front of the passenger's head from the ceiling trim 2, it inflates quickly toward the front of the passenger's head to protect the passenger's head sufficiently.

Also in this embodiment, the ceiling airbag 80C inflates so as to project downward through the ceiling-airbag inflating opening 2a of the ceiling trim 2 in the event of a car collision. However, the ceiling airbag 80C is normally accommodated in a folded state in the case 81 provided in the ceiling-airbag inflating opening 2a, so that the ceiling airbag 80C is not obstructive, keeping preferable appearance in the vehicle cabin.

The foregoing embodiments have airbags which inflate so as to project from a ceiling trim or an instrument panel in the event of a collision as the inflating-position limitation member for the main airbag. However, the structure of the main-airbag inflating-position limitation member is not limited to those. For example, the ceiling trim or the instrument panel may have a projection in advance in place of those airbags.

Figure 11A:
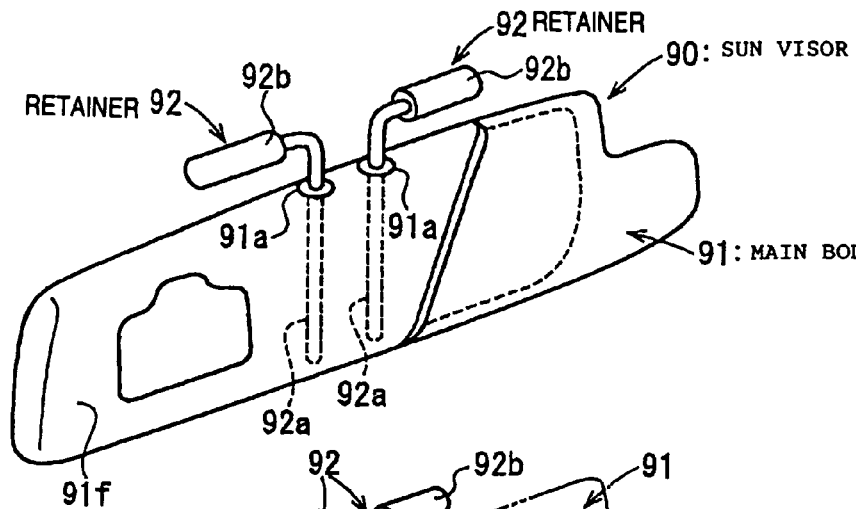
FIGS. 11(a) and 11(b) are perspective views of the structure of a sun visor of an occupant protection device according to further another embodiment.
Figure 11B:
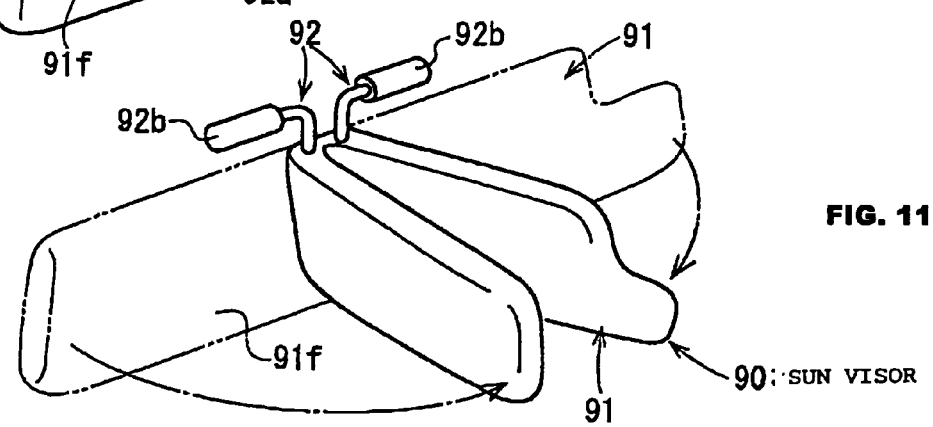
Figure 12:
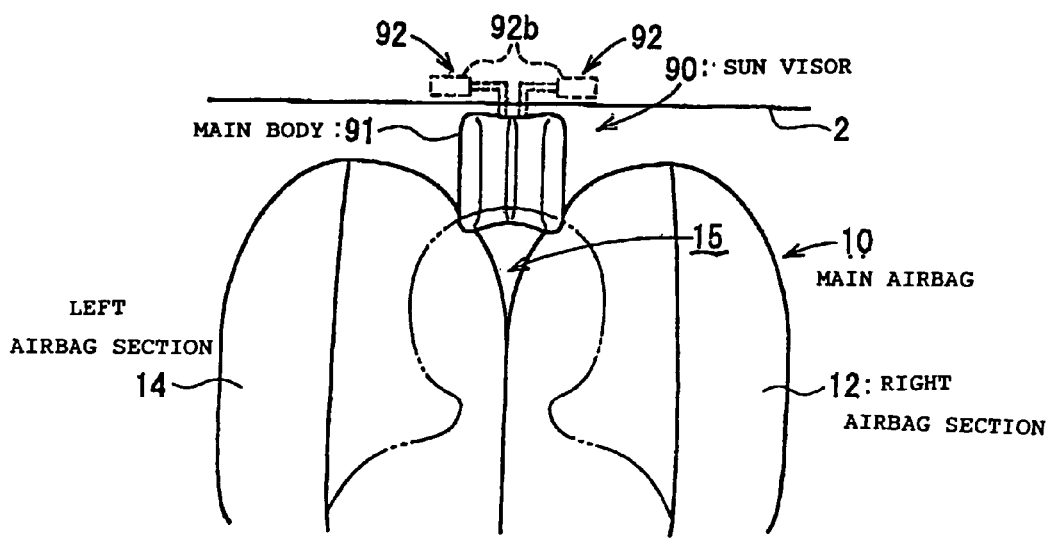
FIG. 12 is a front view of the structure of the occupant protection device of FIG. 11.

FIG. 11(a) is a perspective view of a sun visor serving as the main-airbag inflating-position limitation member of an occupant protection device according to further another embodiment. FIG. 11(b) is a perspective view of the sun visor transformed. FIG. 12 is a front view of the sun visor in engagement with a main airbag.

In this embodiment, a sun visor 90 to be mounted to the cabin ceiling (ceiling trim 2) in front of a passenger seat is constructed as the inflating-position limitation member for the main airbag 10.

The sun visor 90 includes a substantially rectangular-plate-like main body 91 extending laterally and a pair of retainers 92 for rotatably retaining the main body 91 to the ceiling trim 2. As shown in FIG. 11(b), the main body 91 can be folded in two from the lateral center toward a passenger opposing surface 91f. The transformation of the main body 91 may be either elastic or plastic.

The main body 91 has a pair of left and right retainer-engaging holes 91a and 91a open in the vicinity of the lateral center of the upper rim (the upper rim when the main body 91 is suspended from the ceiling trim 2 as shown in FIG. 11(a)). The retainer-engaging holes 91a and 91a are provided vertically from the upper rim of the main body 91 along the extending direction of the plate surface of the main body 91 (the vertical direction when the main body 91 is suspended).

The retainers 92 each include a retaining shaft 92a inserted into the retainer-engaging hole 91a and a turning shaft 92b connected to the upper end of the retaining shaft 92a and rotatably connecting the main body 91 with the ceiling trim 2 such that the main body 91 can be pushed down to or suspended from the ceiling trim 2. The retainer 92 in this embodiment is a substantially L-shaped rod member and so the turning shaft 92b extends from the upper end of the retaining shaft 92a sideway (laterally) substantially at right angles. The retainers 92 are provided to extend from the upper end of the respective retaining shaft 92a in the direction that the turning shafts 92b are separated from each other.

The turning shaft 92b of the retainer 92 is pivotally mounted to a bearing (not shown) provided to the ceiling trim 2. This embodiment includes a driving unit (not shown) for forcing to turn the main body 91 to a suspended position when the main body 91 is in a down position relative to the ceiling trim 2 in the event of a collision.

The sun visor 90 is disposed such that the lateral center (the vicinity of the fold when transformed) of the main body 91 is located substantially in front of the lateral center of the body of a passenger who is in a normal position on the passenger seat.

Also in this embodiment, the main airbag 10 includes the right airbag section 12 which inflates on the right side ahead of the passenger and the left airbag section 14 which inflates on the left side ahead of the passenger and is constructed such that the right airbag section 12 faces the right half of the passenger, the left airbag section 14 faces the left half of the passenger, and a space (not shown) between the tip portions of the bag sections 12 and 14 faces the lateral center of the passenger's body.

When the main airbag 10 inflates when the sun visor 90 is suspended from the ceiling trim 2, the right half of the main body 91 (on the right of the right retainer 92) is pushed by the inflated right airbag section 12 and the left half (on the left of the retainer 92) is pushed by the inflated left airbag section 14 and as such, is transformed into a doubled state from the lateral center thereof toward the passenger opposing surface 91f around the retaining shaft 92a of the retainer 92. Referring to FIG. 12, the doubled main body 91 is fitted into the space 15 between the inflated right airbag section 12 and left airbag section 14.

The main airbag 10 is thus guided by the main body 91 of the sun visor 90 which is fitted between the right airbag section 12 and the left airbag section 14 to inflate surely into a predetermined position. This prevents the lateral rolling etc. of the inflated main airbag 10 to stabilize the inflating position of the main airbag 10.

In this occupant protection device, the sun visor 90 serves as the inflating-position limitation member for the main airbag 10. Accordingly, there is no need to provide a projection projecting from the ceiling trim or the instrument panel, thus simplifying the structure of the inflating-position limitation member for the main airbag and keeping preferable appearance in the vehicle cabin.

It should be understood that the above-described embodiments are merely examples of the present invention and the invention is not limited to the embodiments.

What is claimed is:

1. An occupant protection device comprising:
   a first, lateral airbag portion for being deployed in a predetermined direction toward a vehicle occupant;
   a second, lateral airbag portion for being deployed in the predetermined direction toward the vehicle occupant with the inflated first and second, the lateral airbag portions being laterally spaced from each other transverse to the predetermined deployment direction at respective ends thereof adjacent the vehicle occupant so that the ends of the airbag portions are disconnected from each other; and
   an inflatable positioning member that is deployed and inflated to a predetermined position either between the lateral airbag portions or alongside one of the first and second lateral airbag portions to limit lateral shifting of the airbag portions upon inflation thereof.

2. The occupant protection device of claim 1 wherein the laterally spaced, inflated first and second airbag portions include an open gap therebetween at a predetermined position adjacent the vehicle occupant, and the positioning member is operable to keep the gap at the predetermined position upon inflation of the first and second airbag portions.

3. The occupant protection device of claim 1 wherein the positioning member has an inoperable position and an operable position and shifts from the inoperable position to the operable position as the first and second airbag positions are deployed.

4. The occupant protection device of claim 1 wherein the positioning member comprises an upper projection that extends downwardly toward the first and second airbag portions.

5. The occupant protection device of claim 4 wherein the upper projection extends downwardly toward a position between the laterally spaced, first and second airbag portions.

6. The occupant protection device of claim 4 wherein the upper projection extends downwardly along an outer side of one of first and second airbag portions.

7. The occupant protection device of claim 1 wherein the positioning member comprises at least one projection that generally extends in a direction similar to the predetermined deployment direction of the first and second airbag portions.

8. An occupant protection device comprising:
   a first, lateral airbag portion for being deployed in a predetermined direction toward a vehicle occupant;
   a second, lateral airbag portion for being deployed in the predetermined direction toward the vehicle occupant with the inflated first and second, the lateral airbag portions being laterally spaced from each other transverse to the predetermined deployment direction and adjacent the vehicle occupant; and
   a positioning member that limits lateral shifting of the airbag portions upon inflation thereof,
   wherein the positioning member comprises at least one projection that generally extends in a direction similar to the predetermined deployment direction of the first and second airbag portions, and the at least one projection comprises a pair of projections with one projection extending along an outer side of the first airbag portion, and the other projection extending along an outer side of the second airbag portion.

9. The occupant protection device of claim 1 wherein the positioning member comprises at least one airbag.

10. The occupant protection device of claim 9 wherein the airbag is disposed above the first and second airbag portions prior to deployment and is deployed downwardly toward a position between the laterally spaced, first and second airbag portions.

11. The occupant protection device of claim 9 wherein the airbag is disposed above the first and second airbag portions and is deployed downwardly to extend along an outer side of one of the first and second airbag portions.

12. The occupant protection device of claim 9 wherein the at least one airbag comprises first and second airbags with the first airbag deployed to extend along an outer side of the first airbag portion, and the second airbag deployed to extend along an outer side of the second airbag portion.

13. An occupant protection device comprising:
   a first, lateral airbag portion for being deployed in a predetermined direction toward a vehicle occupant;
   a second, lateral airbag portion for being deployed in the predetermined direction toward the vehicle occupant with the inflated first and second, the lateral airbag portions being laterally spaced from each other transverse to the predetermined deployment direction and adjacent the vehicle occupant; and
   a positioning member that limits lateral shifting of the airbag portions upon inflation thereof, wherein the positioning member comprises a sun visor.

14. The occupant protection device of claim 13 wherein the sun visor has an operable position relative to the first and second airbag portions, and deployment of the first and second airbag portions shifts the sun visor to the operable position thereof.

15. The occupant protection device of claim 1 in combination with a vehicle including the positioning member and in which the airbag portions are deployed.

16. An airbag system for use in a passenger compartment of a vehicle having an occupant seat, an instrument panel forward of the seat and a ceiling extending over the seat, the airbag system comprising:
    a first airbag portion deployed rearwardly toward a first lateral side of the seat;
    a second airbag portion deployed rearwardly toward a second lateral side of the seat;
    an open gap between the inflated first and second airbag portions adjacent the seat so that the first and second airbag portions are laterally spaced and disconnected from each other; and
    an inflatable positioning member operable upon deployment and inflation thereof to keep the open gap at a predetermined position relative to the seat generally aligned with a lateral center thereof upon deployment of the first and second airbag portions.

17. The airbag system of claim 16 wherein the first and second airbag portions each include an inner surface and an outer surface with the inner surfaces generally facing and laterally spaced from each other by the open gap, and the positioning member is shifted upon deployment of the first and second airbag portions to one of: (1) extend into the open gap between the airbag portions, and (2) extend along at least one of the outer surfaces of the airbag portions.

18. An airbag system for use in a passenger compartment of a vehicle having an occupant seat, an instrument panel forward of the seat and a ceiling extending over the seat, the airbag system comprising:
    a first airbag portion deployed rearwardly toward a first lateral side of the seat;
    a second airbag portion deployed rearwardly toward a second lateral side of the seat;
    an open gap between the inflated first and second airbag portions adjacent the seat so that the first and second airbag portions are laterally spaced from each other; and
    a positioning member operable to keep the open gap at a predetermined position relative to the seat generally aligned with a lateral center thereof upon deployment of the first and second airbag portions;
    wherein the first and second airbag portions each include an inner surface and an outer surface with the inner surfaces generally facing and laterally spaced from each other by the open gap, and the positioning member is shifted upon deployment of the first and second airbag portions to one of: (1) extend into the open gap between the airbag portions, and (2) extend along at least one of the outer surfaces of the airbag portions, and the positioning member comprises first and second positioning members so that the first positioning member extends along the outer side of the first airbag portion and the second positioning member extends along the outer side of the second airbag portion.

19. The airbag system of claim 17 wherein the positioning member extends from one of the passenger compartment ceiling and the instrument panel to an operable position to keep the gap between the airbag portions at the predetermined position thereof.

20. The airbag system of claim 19 wherein the positioning member comprises an airbag.

21. An airbag system for use in a passenger compartment of a vehicle having an occupant seat, an instrument panel forward of the seat and a ceiling extending over the seat, the airbag system comprising:
    a first airbag portion deployed rearwardly toward a first lateral side of the seat;
    a second airbag portion deployed rearwardly toward a second lateral side of the seat;
    an open gap between the inflated first and second airbag portions adjacent the seat so that the first and second airbag portions are laterally spaced from each other; and
    a positioning member operable to keep the open gap at a predetermined position relative to the seat generally aligned with a lateral center thereof upon deployment of the first and second airbag portions, wherein the positioning member comprises a sun visor.

22. The airbag system of claim 21 wherein the sun visor has folding portions that pivot from a sun blocking configuration toward each other into the gap between the airbag portions upon deployment thereof.

23. The airbag system of claim 16 in combination with the vehicle.

24. An airbag system for a passenger compartment of a vehicle, the airbag system comprising:
    an airbag for being deployed rearwardly toward an occupant on a seat in the passenger compartment;
    a first, lateral portion of the airbag;
    a second, lateral portion of the airbag;
    a rear, open gap between the first and second lateral portions of the airbag that is completely open to the vehicle occupant so that laterally spaced rear ends of the first and second lateral portions are disconnected from each other; and
    a positioning member that is deployed to a predetermined position in overlapping relation to at least one of the deployed and inflated first and second lateral portions of the airbag to extend alongside the at least one lateral airbag portion.

25. The airbag system of claim 24 wherein the positioning member is another airbag.

26. The airbag system of claim 24 wherein the positioning member is a sun visor.

* * * * *